Patented Apr. 25, 1933

1,905,026

UNITED STATES PATENT OFFICE

RICHARD ALMY, OF LITTLE COMPTON, RHODE ISLAND, ASSIGNOR TO DEWEY AND ALMY CHEMICAL COMPANY, OF NORTH CAMBRIDGE, MASSACHUSETTS, A CORPORATION OF MASSACHUSETTS

DISPERSION OF RUBBER IN NONAQUEOUS LIQUIDS

No Drawing.   Application filed October 16, 1930.   Serial No. 489,243.

This invention relates to a colloidal dispersion of rubber in non-aqueous materials such as high boiling oils or solids readily liquefiable by heat, and to a method by which such a dispersion is obtained.

It is sometimes desirable to impart to readily heat-liquefiable solids, such as paraffine, beeswax, cumar etc. some of the properties characteristic of rubber.

The heretofore used or suggested methods have been unsatisfactory in one or another particular, thus, while readily liquefiable solids, to a limited extent, may be worked into rubber on the usual rubber compound mill, it is impossible to obtain a dispersion of rubber in liquefiable solids without gross changes in the rubber due to the required long and drastic mechanical treatment together with the resulting high temperatures. Furthermore, such a method can not yield a product in which the disseminated rubber could be said to even remotely approach the minute dimensions of the particles of a colloidal dispersion.

It has already been proposed to disperse rubber in liquefiable solids by stirring an aqueous dispersion of rubber into the molten solid at temperatures above 100° C. This process is unsatisfactory for several reasons. Thus, the introduction of water to a molten solid at a temperature well above the boiling point of water may cause explosive splattering and inevitably produces highly objectionable frothing. The objection to frothing is not only that of process difficulty but because of its aggregating effect on the rubber particles. It is well known that aqueous dispersions of rubber and particularly natural latex are extremely susceptible to coagulation when in such thin films as are produced by frothing. It is also well known that latex is coagulated by boiling and that even though added protectives such as proteins, soaps and the like are added, boiling induces coagulative agglomeration, that is the agglomeration of minute colloidal particles into large irreversible flocks. These agglomerates are objectionable and persistent. Furthermore, high temperatures are well known to be detrimental to rubber in other respects.

It is an object of this invention to produce colloidal dispersions of rubber in non-aqueous materials without recourse to such high temperatures as have been used in heretofore suggested processes and it is a further object of this invention to provide a method of making such dispersions as will avoid any substantial agglomeration of the colloidal rubber particles into large non-colloidal flocks. Other objects will appear from the following description.

In practicing this invention a concentrated latex of about 70–80% solids is preferably employed. This is of advantage in that the amount of water to be evaporated during the process is greatly reduced. A product suitable for the purpose is a natural latex to which a small amount of soap has been added as a protective agent and thereafter concentrated by desiccation to a solid content of 75% or thereabout. This concentrated latex may be heated over an open water bath and may be thus held at a temperature which approximates but may not rise above the boiling point of water. A steam jacketed kettle may be used provided precautions are taken to avoid ebullition. To this concentrated latex the heat-liquefied solid or hot oil is slowly added with gentle continuous stirring. The latter material first emulsifies in the latex to produce an oil-in-water type of emulsion from which the water subsequently evaporates. In general, by the time that enough hot liquid to constitute 85–95% of the product has been added to the latex, the water will be found to have been vaporized substantially in its entirety.

In order more specifically to describe the invention, the following example is given which, however, is to be taken as illustrative only, as the paraffine wax and the ratio of rubber to nonrubber material may be varied without departing from the spirit and scope of the invention, excepting as it is limited by the appended claims. One pound of rubber, in the form of concentrated latex, containing about 25% water is heated in a vessel over an open bath of boiling water. Fifteen pounds of paraffine wax are melted in any suitable vessel and thereafter slowly and continuously stirred into the hot concentrated latex over the water bath. The stirring should, while continuous, be such as to avoid a whipping action inducive of bubbling; care being taken in this respect so that the admixture of molten paraffine will not be attended with any appreciable frothing. The slow continuous addition of paraffine in the above amount, will require approximately 30 minutes and stirring should be continued thereafter for such time as experience has shown is requisite for the complete vaporization of the residual moisture. In the instant illustration 10-20 minutes additional stirring with continued heating should suffice.

It is found desirable, in adding the nonaqueous liquid to the latex, to have the liquid at approximately the boiling point of water or slightly above, although it will be clear that with low melting waxes the temperature may conceivably be below the boiling point of water. The water, in this latter case, will be driven off from the mixture by evaporation much more slowly than at higher temperatures necessitating a longer time for mixing and stirring. When a solid having a high melting point is added to the latex, it is necessary to add the melted solid at a slow rate to prevent undue boiling and frothing of the mixture. Preferably, the molten wax or oil is added at or slightly above the temperature of boiling water, in order to maintain rapid evaporation of the water, but without any frothing and bubbling due to sudden addition of heat.

A great variety of waxes, heat liquefiable gums, high boiling oils etc. may be used singly or combined as to the continuous phase of non-aqueous dispersions of rubber by the method of this invention. Coloring agents, fillers and sometimes aromatic flavorings as well as vulcanizing agents and accelerators may be added, preferably after the introduction of the hot liquid. If vulcanized rubber be desired in the end product, however, I prefer to start with a vulcanized concentrated aqueous dispersion of rubber. The proportions of rubber to liquefiable solids or oils may, dependent upon the character of the latter, be varied over a fairly wide range so long as the non-rubber material is in such excess over the rubber as to remain the continuous phase.

Microscopic examination of a product of the method of this invention discloses the fact that the rubber globules of the natural dispersion in the latex do not undergo any appreciable agglomeration during redispersion in the non-aqueous medium and are for the most part in the state in which they originally existed in the aqueous dispersion.

I claim:

1. The method of colloidally dispersing rubber in paraffin wax which comprises adding molten paraffin wax to concentrated latex at a temperature approximating the boiling point of water to produce an oil-in-water type of emulsion of the paraffin in the latex and heating the mixture to remove the water by evaporation.

2. The method of collodially dispersing rubber in high boiling oils which comprises adding a high boiling oil to concentrated latex at a temperature approximating the boiling point of water to produce an oil-in-water type of emulsion of the high boiling oil in the latex and heating the mixture to remove the water by evaporation.

3. The method of colloidally dispersing rubber in cumar which comprises adding cumar to concentrated latex at a temperature approximating the boiling point of water to produce an oil-in-water type of emulsion of the cumar in the latex and heating the mixture to remove the water by evaporation.

4. The method of collodially dispersing rubber in a material chosen from the group consisting of paraffin wax, high boiling oils, cumar, and beeswax, which comprises adding the material to an aqueous collodial rubber dispersion at a temperature approximating the boiling point of water to produce an oil-in-water type of emulsion of the said material in the aqueous dispersion and subsequently removing the water by evaporation.

5. The method of collodially dispersing rubber in a material having the characteristics of the members of the group consisting of paraffin wax, high boiling oils, cumar, and beeswax, which comprises adding the material to an aqueous colloidal rubber dispersion at a temperature approximating the boiling point of water to produce an oil-in-water type of emulsion of the said material in the aqueous dispersion and subsequently removing the water by evaporation.

6. The method of colloidally dispersing rubber in paraffin wax which comprises adding molten paraffin wax below the boiling point of water to hot concentrated latex to produce an oil-in-water type of emulsion of the paraffin in the latex and heating the mixture to remove the water by evaporation.

7. The method of colloidally dispersing rubber in high boiling oils which comprises adding a hot high boiling oil below the boiling point of water to hot concentrated latex to produce an oil-in-water type of emulsion of the high boiling oil in the latex and heating the mixture to remove the water by evaporation.

8. The method of colloidally dispersing rubber in cumar which comprises adding hot cumar below the boiling point of water to hot concentrated latex to produce an oil-in-water type of emulsion of the cumar in the latex and heating the mixture to remove the water by evaporation.

9. The method of colloidally dispersing rubber in a material chosen from the group consisting of paraffin wax, high boiling oils, cumar, and beeswax, which comprises adding the hot material below the boiling point of water to a hot aqueous colloidal rubber dispersion to produce an oil-in-water type of emulsion of the said material in the aqueous dispersion and subsequently removing the water by evaporation.

10. The method of colloidally dispersing rubber in a material having the characteristics of the members of the group consisting of paraffin wax, high boiling oils, cumar, and beeswax, which comprises adding the hot material below the boiling point of water to a hot aqueous colloidal rubber dispersion to produce an oil-in-water type of emulsion of the said material in the aqueous dispersion and subsequently removing the water by evaporation.

Signed by me at St. Louis, Missouri, this 8th day of October, 1930.

RICHARD ALMY.